(12) United States Patent
Hong (10) Patent No.: US 9,866,465 B2
(45) Date of Patent: Jan. 9, 2018

(54) METHOD OF CONTROLLING PACKET TRANSMISSION INTERVAL

(71) Applicant: SAMSUNG SDS CO., LTD., Seoul (KR)

(72) Inventor: Jae Man Hong, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 81 days.

(21) Appl. No.: 14/884,912

(22) Filed: Oct. 16, 2015

(65) Prior Publication Data

US 2016/0112336 A1 Apr. 21, 2016

(30) Foreign Application Priority Data

Oct. 16, 2014 (KR) .................. 10-2014-0139999

(51) Int. Cl.
*H04L 12/26* (2006.01)

(52) U.S. Cl.
CPC .......... *H04L 43/16* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 2008/0175164 A1* | 7/2008 | Clark | H04L 41/5003 370/252 |
| 2011/0032836 A1* | 2/2011 | Maruhashi | H04L 12/12 370/252 |
| 2012/0026905 A1* | 2/2012 | Sugiyama | H04L 12/2697 370/252 |
| 2015/0124640 A1* | 5/2015 | Chu | H04L 45/22 370/253 |
| 2015/0149631 A1* | 5/2015 | Lissack | H04L 41/5051 709/226 |

FOREIGN PATENT DOCUMENTS

| | | |
|---|---|---|
| JP | 5186355 B2 | 4/2013 |
| KR | 2003-0095995 A | 12/2003 |
| KR | 10-0651469 B1 | 11/2006 |
| KR | 101368647 B1 | 3/2014 |

OTHER PUBLICATIONS

Communication issued Jan. 14, 2016, issued by the Korean Intellectual Property Office in counterpart Korean Patent Application No. 10-2014-0139999.

* cited by examiner

*Primary Examiner* — Xavier Szewai Wong
(74) *Attorney, Agent, or Firm* — Sughrue Mion, PLLC

(57) ABSTRACT

According to an aspect of present invention provides method of controlling a packet transmission interval, method comprising, comparing a preset delay ratio with number of packets transmitted, transmitting packets until number of packets transmitted becomes equal to or greater than delay ratio, calculating a delay request time when number of packets transmitted becomes equal to or greater than delay ratio, generating a signal for suspending packet transmission during calculated delay request time, suspending packet transmission according to generated signal and calculating a gap time based on a difference between a time when suspension of packet transmission was terminated and packet transmission was started and updating the delay ratio using the calculated gap time and initializing the number of packets transmitted.

9 Claims, 4 Drawing Sheets

Step 1 — 510

DELAY RATIO : 1
DELAY TIME : 20MS

ACTUAL DELAY TIME : 480MS
DATA PROCESSING TIME : 20MS  } UPDATED DELAY RATIO $= \dfrac{500MS}{20MS} = 25$
GAP TIME : 500MS Step 2 — 520

DELAY RATIO : 25
DELAY REQUEST TIME : 25 X 20MS = 500MS

ACTUAL DELAY TIME : 500MS
DATA PROCESSING TIME : 50MS  } UPDATED DELAY RATIO $= \dfrac{550MS}{20MS} = 27$
GAP TIME : 550MS Step 3 — 530

DELAY RATIO : 27
DELAY REQUEST TIME : 27 X 20MS = 540MS

ACTUAL DELAY TIME : 500MS
DATA PROCESSING TIME : 50MS  } UPDATED DELAY RATIO $= \dfrac{550MS}{20MS} = 27$
GAP TIME : 550MS Step 4 — 540

REPEAT STEP 3

[Fig. 6]

METHOD OF CONTROLLING PACKET TRANSMISSION INTERVAL

This application claims priority from Korean Patent Application No. 10-2014-0139999 filed on Oct. 16, 2014 in the Korean Intellectual Property Office, the disclosure of which is incorporated herein by reference in its entirety.

BACKGROUND OF THE INVENTION

1. Field of the Invention

The present invention relates to a method of controlling a packet transmission interval, and more particularly, to a method of controlling a packet transmission interval, the method being employed to minimize delay errors by controlling an interval between packets to be transmitted and maintain a constant transmission performance.

2. Description of the Related Art

A constant delay time should be maintained between packets in order to transmit packets at a constant transmission speed through a network.

For example, when the maximum amount of data that can be included in one packet is 1500 bytes and when data is to be transmitted at a speed of 1 gigabits per second (Gbps), 83,333 packets should be transmitted per second (1 Gbit=125,000,000 bytes, 125,000,000/1500≈83,333). Therefore, an interval between packets should be 12 μs.

To maintain the interval of 12 μs, a SLEEP function provided by an operating system (OS) kernel is used. According to the SLEEP function, however, as the interval between packets is reduced to less than 1 ms, errors increase, thereby reducing the transmission speed without intention.

In addition, whenever one packet is transmitted, the interval between packets is measured, and the measured interval is compared with a preset delay time. Then, if the two values are different, the interval between packets should be adjusted, thus causing overhead on a central processing unit (CPU).

Accordingly, this has led to the need for a method of controlling a packet transmission interval, the method capable of minimizing CPU computation overhead and allowing packets to be transmitted at regular intervals at a target transmission speed.

SUMMARY OF THE INVENTION

Aspects of the present invention provide a method of controlling a packet transmission interval, the method being employed to transmit data at a target bandwidth, i.e., at a target transmission speed by minimizing a transmission error range.

Aspects of the present invention also provide a method of controlling a packet transmission interval, the method capable of preventing a transmission delay due to an excessive amount of computation allocated by minimizing overhead on a central processing unit (CPU) resulting from repeated computation performed to frequently correct an interval between packets.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention provides method of controlling a packet transmission interval, the method comprising, comparing a preset delay ratio with the number of packets transmitted, transmitting packets until the number of packets transmitted becomes equal to or greater than the delay ratio, calculating a delay request time when the number of packets transmitted becomes equal to or greater than the delay ratio, generating a signal for suspending packet transmission during the calculated delay request time, suspending the packet transmission according to the generated signal and calculating a gap time based on a difference between a time when the suspension of the packet transmission was terminated and the packet transmission was started and updating the delay ratio using the calculated gap time and initializing the number of packets transmitted.

According to an aspect of the present invention, further comprising transmitting packets until the initialized number of packets transmitted becomes equal to or greater than the updated delay ratio.

According to an aspect of the present invention, wherein the updating of the delay ratio using the calculated gap time and the initializing of the number of packets transmitted comprises updating the delay ratio to a value obtained by dividing the gap time by the delay ratio.

According to an aspect of the present invention, wherein the calculating of the delay request time comprises calculating the delay request time by multiplying the delay ratio by a preset delay time.

According to an aspect of the present invention, wherein the preset delay time is a time interval set between packets to transmit data at a preset transmission speed.

According to an aspect of the present invention, wherein the delay ratio can be changed according to at least one value of network bandwidth, the size of data to be transmitted, and central processing unit (CPU) resources allocated to an application.

According to an aspect of the present invention provides apparatus for controlling a packet transmission interval, the apparatus comprising, a comparison unit which compares a preset delay ratio with the number of packets transmitted, a packet transmission unit which transmits packets until the number of packets transmitted becomes equal to or greater than the delay ratio, a delay request time calculation unit which calculates a delay request time when the number of packets transmitted becomes equal to or greater than the delay ratio, a delay processing unit which generates a signal for suspending packet transmission during the calculated delay request time, a gap time calculation unit which calculates a gap time based on a difference between a time when the suspension of the packet transmission was terminated and a time when the packet transmission was started; and a transmission speed control unit which updates the delay ratio based on the calculated gap time and initializes the number of packets transmitted.

According to an aspect of the present invention, wherein after the delay ratio is updated and the number of packets transmitted is initialized, the packet transmission unit transmits packets until the initialized number of packets transmitted becomes equal to or greater than the updated delay ratio.

According to an aspect of the present invention, wherein the transmission speed control unit updates the delay ratio to a value obtained by dividing the gap time by the preset delay ratio.

According to an aspect of the present invention, wherein the delay request time calculation unit calculates the delay request time by multiplying the preset delay ratio by a preset delay time.

According to an aspect of the present invention, wherein the preset delay time is a time interval set between packets to transmit data at a preset transmission speed.

According to an aspect of the present invention, wherein the delay ratio can be changed according to at least one value of network bandwidth, the size of data to be transmitted, and CPU resources allocated to an application.

Another embodiment of the present invention provides a computer readable recording medium in which a computer program performing the method of controlling a packet transmission interval according to the embodiment of the present invention is recorded.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
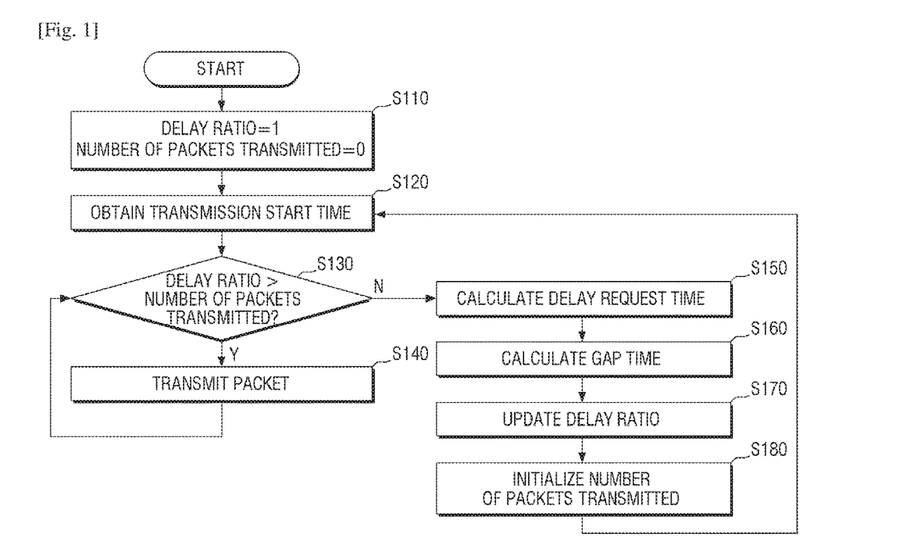
FIG. 1 is a flowchart illustrating a method of controlling a packet transmission interval according to an embodiment of the present invention.

Hereinafter, a method of controlling a packet transmission interval according to an embodiment of the present invention will be described with reference to FIG. 1. The current embodiment may be performed by a computing device including a computing unit. For ease of description, a description of a subject that performs each operation of the method of controlling the packet transmission interval according to the current embodiment will be omitted.

Before packets are transmitted, a delay ratio and the number of packets transmitted are set. The delay ratio denotes a ratio of an actual packet transmission time interval and a user's desired transmission time interval. The actual packet transmission time interval should most ideally be equal to the transmission time interval desired by the user. Therefore, an initial value of the delay ratio may be set to "1." The delay ratio can be changed to a different value according to the actual packet transmission time interval.

The number of packets transmitted denotes the number of packets transmitted as of now. Since no packet has been transmitted yet, the number of packets transmitted is initially set to "0" (operation S110).

Then, a packet transmission start time is obtained (operation S120). The packet transmission start time may be used to measure the actual packet transmission time interval. Specifically, a delay time between packets can be measured using a difference between a time when the transmission of one packet was completed and the initially measured transmission start time.

Once the transmission start time is obtained, the preset delay ratio and the number of packets transmitted are compared (operation S130). When it is determined that the preset delay ratio is greater than the number of packets transmitted, one packet is transmitted (operation S140).

Since the delay ratio is initially set to "1" and the number of packets transmitted is "0," one packet is transmitted. Then, packets are continuously transmitted until the number of packets transmitted becomes equal to or greater than the delay ratio. When the number of packets transmitted becomes equal to or greater than the delay ratio, a delay request time for maintaining the packet transmission time interval constant is calculated (operation S150).

Specifically, the delay request time is calculated by multiplying a delay time, which is preset by the user such that packets are transmitted at regular time intervals, by the preset delay ratio. For example, when the user sets the delay time such that packets are transmitted at intervals of 20 μs, 20 μs is calculated as the delay request time by multiplying 20 μs by the initially set delay ratio of 1.

Next, a termination time is requested to calculate a data processing time, and a gap time is calculated using a difference between the termination time and the initially obtained transmission start time.

Specifically, the gap time is calculated based on a difference between the delay request time and the time required to packet transmission. For example, in a case where the actual delay time is 20 μs and where the data processing time of a central processing unit (CPU) is 10 μs, the gap time is 30 μs.

After the gap time is calculated as described above, the delay ratio is updated using the gap time (operation S170). Specifically, a new delay ratio is calculated by dividing the gap time by the delay time preset by the user as follows.

$$\text{Delay ratio} = \text{gap time}/\text{delay time} \quad (1)$$

When the new delay ratio is determined, the number of packets transmitted is initialized to "0," and the above process is repeated based on the delay ratio updated to a new value.

As described above, a delay ratio may be updated based on a delay time desired by a user and an actual packet transmission interval measured, and packets may be transmitted according to the updated delay ratio. In so doing, the packets can be transmitted at a constant speed, and CPU overload due to an excessive amount of computation required can be prevented.

Figures 2, 3:
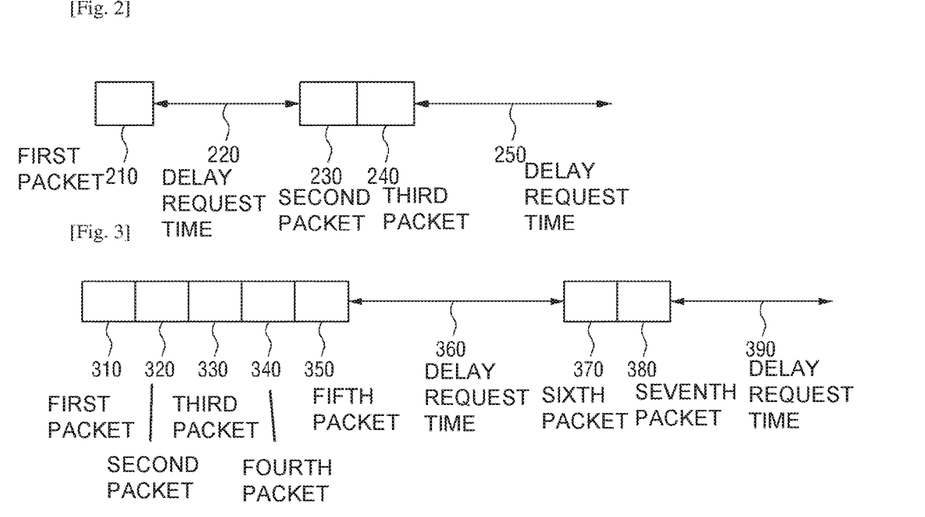
FIG. 2 illustrates a process of transmitting packets according to an embodiment of the present invention.
FIG. 3 illustrates a process of transmitting packets when an initial delay ratio is changed according to an embodiment of the present invention.

FIG. 2 illustrates a process of transmitting packets according to an embodiment of the present invention.

In the current embodiment, a case where a delay time preset by a user is 20 μs and where an initial delay ratio is 1 is described as an example. However, the present invention is not limited to this case, and the delay time and the initial delay ratio can be set to different values according to network situation and the amount of data to be transmitted.

When a data transmission request is input by the user, the delay ratio set to 1 as a default value is compared with the number of packets transmitted. When the number of packets transmitted is smaller than the initially set delay ratio, packets are continuously transmitted until the number of packets transmitted becomes equal to or greater than the delay ratio.

Since no packet has been transmitted yet, the number of packets transmitted has a smaller value than the delay ratio. Therefore, a first packet 210 is transmitted. Packet transmission is continued until the number of packets transmitted becomes equal to or greater than the delay ratio. In the current embodiment, since the delay ratio is set to 1, the number of packets transmitted becomes equal to the delay ratio by the transmission of one packet.

After one packet is transmitted, a delay request time 220 is calculated. As described above, the delay request time is calculated by multiplying the preset delay ratio the preset delay time. In the current embodiment, the initial delay ratio is set to "1," and the delay time is set to "20 µs." Therefore, the delay request time 220 is 20 µs.

After the delay request time 220 is calculated, the packet transmission is delayed for the calculated delay request time. Then, a packet transmission termination time is requested to measure the time required to actually transmit one packet, and a difference between the packet transmission termination time and an initially obtained transmission start time is calculated.

Here, a gap time is the sum of the time required to process data and an actual delay time. For example, when the actual delay time is 10 µs and the data processing time is 30 µs, the gap time is 40 µs.

After the gap time is calculated, the delay ratio is updated to a new value. As described above, the delay ratio is determined to be a ratio of the gap time and the delay time preset by the user. In the current embodiment, since the calculated gap time is 40 µs and the preset delay time is 20 µs, the delay ratio is updated to 2.

After the delay ratio is updated from the initial value to a new value, the number of packets transmitted is initialized to "0." After the update of the delay ratio and the initialization of the number of packets transmitted, new packets are transmitted based on the updated delay ratio and the initialized number of packets transmitted.

Specifically, since the newly updated delay ratio is 2 and the number of packets transmitted has been initialized to "0," packets are continuously transmitted until the number of packets transmitted becomes greater than or equal to the updated delay ratio.

In the current embodiment, since the updated delay ratio is 2, a second packet 230 and a third packet 240 are transmitted successively until the number of packets transmitted becomes 2. After the transmission of the two packets, a new delay request time 250 is calculated. As described above, the delay request time is calculated by multiplying the delay ratio by the delay time. Therefore, in the current embodiment, the new delay request time 250 is determined to be 20 µs×2=40 µs.

That is, two packets are transmitted successively according to the delay ratio updated to 2, thereby doubling the delay request time. Again, the delay ratio is updated, and the number of packets transmitted is initialized through the same process as the above process.

The gap time required to transmit at least one packet may become significantly greater than the delay request time depending on current network situation. For example, even if the user sets the delay time to 20 µs, the time required to actually transmit a packet may be 480 µs.

In this case, if the data processing time is 20 µs, the gap time may be 500 µs (actual delay time of 480 µs+data processing time of 20 µs), and the delay ratio may be 25. Therefore, when the packet transmission resumes after the initialization of the number of packets transmitted, 25 packets are transmitted successively without a delay time.

After the 25 packets are transmitted successively, a new delay request time is calculated. Since the delay request time is calculated by multiplying the delay time preset by the user by the delay ratio as described above, it is 20 µs×25=500 µs.

That is, after the 25 packets are transmitted successively, a signal for requesting the delay of the packet transmission for 500 µs is generated, and the above process is repeated until the transmission of all data packets is completed.

As described above, a ratio of the time required to actually transmit a packet and a delay time desired by a user may be calculated, and then a number of packets corresponding to the calculated ratio may be transmitted successively. In so doing, delay errors can be offset, and a packet transmission interval can be adaptively corrected according to current network situation.

In the above embodiment, a case where the delay ratio preset by the user is "1" has been described. However, the delay ratio can be changed according to network situation or the size of data to be transmitted.

FIG. 3 illustrates a process of transmitting packets when an initial delay ratio is changed according to an embodiment of the present invention.

As described above, a delay ratio set initially can have a value other than "1" depending on network situation, CPU resources currently allocated to an application that transmits data, or the size of data to be transmitted.

For example, if the delay ratio is initially set to "5," since packets are transmitted until the number of packets transmitted becomes equal to or greater than the value of the delay ratio, first through fifth packets 310 through 350 are transmitted successively without a delay time.

After the transmission of the first through fifth packets 310 through 350, a signal is generated to request the suspension of packet transmission for a period of time corresponding to a value obtained by multiplying a delay time preset by a user by the delay ratio of 5. For example, when the user sets a packet transmission interval to 20 µs, a delay request time 360 may be 20 µs×5=100 µs.

That is, as the initial delay ratio is set to a higher value, the number of packets transmitted initially increases, and the delay request time after the packet transmission also increases.

Therefore, when CPU resources currently allocated to an application that transmits data are not enough while enough bandwidth is available, the initial delay ratio may be set to a high value. In so doing, a plurality of packets can initially be transmitted successively, and the amount of CPU computation required can be reduced for a relatively long period of time.

Later, when the time required to actually transmit a packet becomes greater or smaller than the delay request time due to a change in the data transmission environment (such as network bandwidth situation, CPU utilization rate, etc.), the delay ratio may be changed. Accordingly, the number of packets transmitted successively and the delay request time can be corrected adaptively.

For example, when an actual delay time is 40 µs which is smaller than the delay request time 360 of 100 µs, the delay ratio is updated to 2 by Equation (1).

Therefore, data packets are transmitted in a different way from before. Specifically, two packets, i.e., a sixth packet 370 and a seventh packet 380 are transmitted successively, and the delay request time 390 is changed to 40 µs.

As described above, if data is transmitted by setting an initial delay ratio to a different value according to the data transmission environment and then adaptively correcting the delay ratio by reflecting a change in the data transmission environment, a certain number of packets can be stably transmitted without an error for a predetermined period of time.

Figure 4:
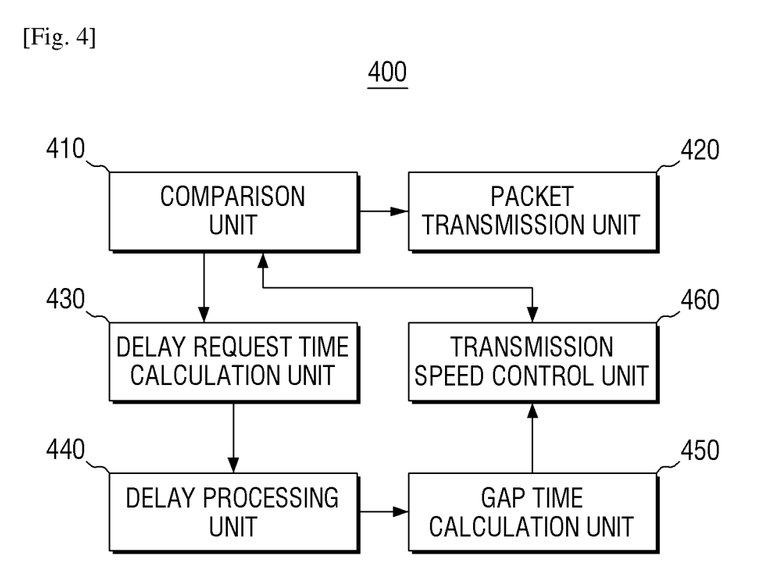
FIG. 4 is a block diagram of an apparatus for controlling a packet transmission interval according to an embodiment of the present invention.

FIG. 4 is a block diagram of an apparatus 400 for controlling a packet transmission interval according to an embodiment of the present invention.

Of various components of the apparatus 400 for controlling the packet transmission interval, components related to the current embodiment are illustrated in FIG. 4. Therefore, those of ordinary skill in the art to which the present invention pertains will understand that the apparatus 400 includes other general-purpose components in addition to the components illustrated in FIG. 4.

The apparatus 400 for controlling the packet transmission interval illustrated in FIG. 4 includes a comparison unit 410, a packet transmission unit 420, a delay request time calculation unit 430, a delay processing unit 440, a gap time calculation unit 450, and a transmission speed control unit 460.

The comparison unit 410 compares a preset delay ratio with the number of packets transmitted.

Here, the delay ratio denotes a ratio of an actual packet transmission time interval and a transmission time interval desired by a user. According to an embodiment of the present invention, the delay ratio may be set to "1" as a default value. However, the present invention is not limited thereto, and the delay ratio can also be set to a different value according to network bandwidth, CPU resources allocated to an application that transmits data, the amount of data to be transmitted, etc.

The packet transmission unit 420 transmits packets until the number of packets transmitted becomes equal to or greater than the preset delay ratio.

Since the number of packets transmitted is initially "0," if the preset delay ratio is "5," packets are transmitted successively until the number of packets transmitted becomes equal to or greater than 5. That is, the number of packets initially transmitted successively without a delay time may be determined by the delay ratio set by the user.

The delay request time calculation unit 430 calculates a delay request time when the number of packets transmitted becomes equal to or greater than the preset delay ratio. Here, the delay request time denotes a period of time during which packet transmission is suspended to maintain the transmission speed constant after a number of packets corresponding to the delay ratio are transmitted.

Specifically, the delay request time is calculated by multiplying the preset delay ratio by a delay time set by the user to maintain the transmission interval constant.

For example, in a case where the maximum size of one packet is 1500 bytes and where data is to be transmitted at a transmission speed of 1 gigabits per second (Gbps), approximately 83,333 packets should be transmitted for one second. Therefore, the interval between packets may be 12 μs. In this case, if the initial delay ratio is set to "1," the delay request time may be 12 μs×1=12.

After the delay request time is calculated, the delay processing unit 440 generates a signal for suspending packet transmission during the calculated delay request time. In the above example, after one packet is transmitted, the delay processing unit 440 controls a next packet to be transmitted after the calculated delay request time of 12 μs.

The gap time calculation unit 450 checks a packet transmission start time and a time after packet transmission is delayed by the delay processing unit 440 for the delay request time and calculates a gap time using a difference between the two times. That is, the gap time is the sum of a data processing time for packet transmission and the delay request time during which the packet transmission is delayed by the delay processing unit 440.

For example, if the data processing time for packet transmission is 10 μs and if the delay request time during which packet transmission is delayed by the delay processing unit 440 is 30 μs, the gap time is 40 μs.

After the gap time is calculated, the transmission speed control unit 460 updates the delay ratio using the calculated gap time and initializes the number of packets transmitted. Specifically, the delay ratio is updated by dividing the calculated gap time by the delay time.

In the above example, to transmit 1500-byte packets at a constant speed of 1 Gbps, the interval between packets, that is, the delay time may be 12 μs, and the gap time required to actually transmit a packet may be 36 μs. In this case, the delay ratio may be 36 μs/12 μs=3. When the delay ratio is updated by the transmission speed control unit 460, the number of packets transmitted is initialized to 0.

After the update of the delay ratio to a new value and the initialization of the number of packets transmitted, the above process is repeated until all data are transmitted. Therefore, the number of packets transmitted successively without an interval between packets transmitted and without a delay time can be corrected adaptively. Accordingly, this can minimize errors and allow data to be transmitted at constant speed.

Each component of FIG. 4 means, but is not limited to, a software component or a hardware component such as a Field Programmable Gate Array (FPGA) or Application Specific Integrated Circuit (ASIC). A component may advantageously be configured to reside on the addressable storage medium and configured to execute on one or more processors. The functionality provided for in the components may be combined into fewer components or further separated into additional components.

Figure 5:
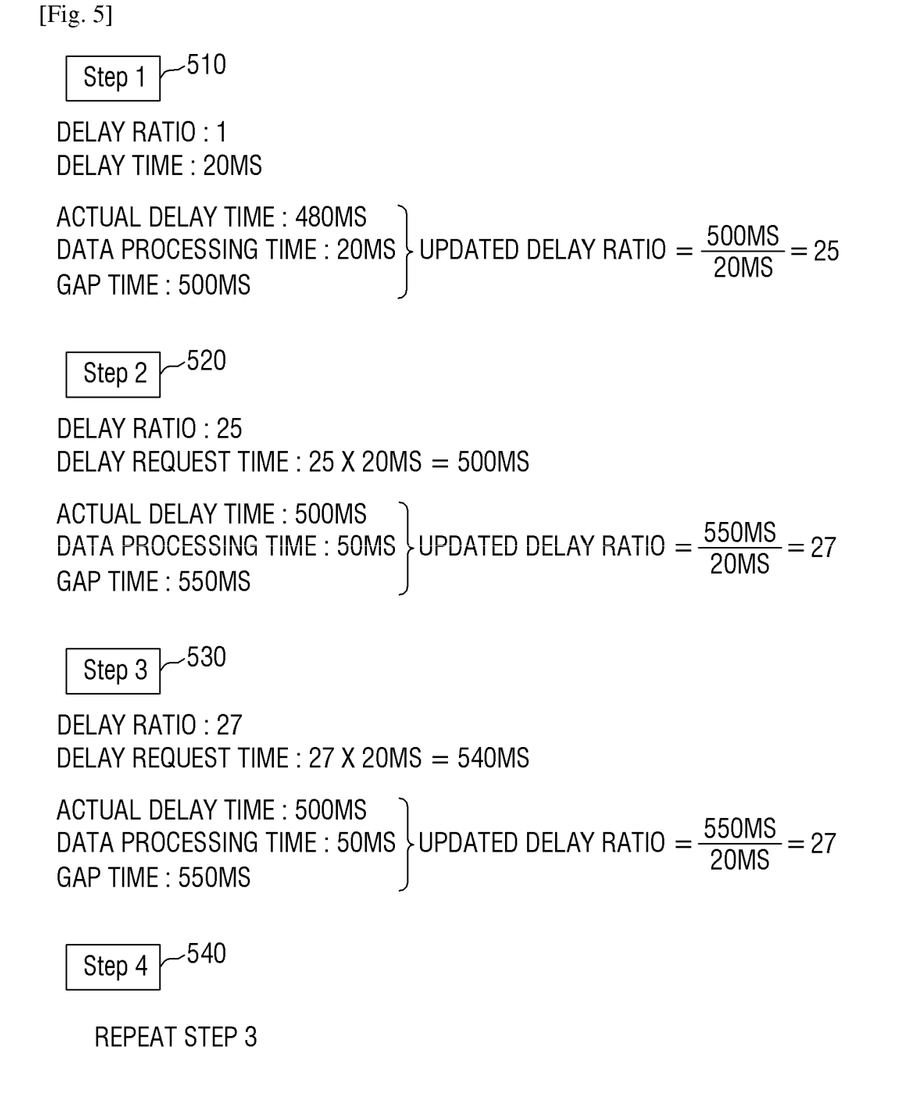
FIG. 5 illustrates a process of reducing errors by increasing a delay request time according to an embodiment of the present invention.

FIG. 5 illustrates a process of reducing errors by increasing a delay request time according to an embodiment of the present invention.

In the current embodiment, a process in which a delay request time after a certain number of packets are transmitted becomes greater than a delay time required to transmit packets at a constant speed will be described in view of the time required for a CPU to actually process data.

When the data transmission speed increases, the number of packets that should be transmitted per unit time increases. This reduces a transmission interval between packets, thereby increasing errors. In a general x86 CPU environment, errors hardly occur at a transmission interval of 1 ms or more. However, as the transmission interval is reduced, errors increase, thereby reducing the transmission speed. According to an embodiment of the present invention, errors can be minimized by adaptively correcting the delay request time, that is, the transmission interval between packets.

In the current embodiment, a case where an initially set delay ratio is "1" and where the transmission interval between packets is set to 20 μs in order to transmit packets at a constant speed will be described as an example.

In a first step 510, no packet has been transmitted yet. Therefore, one packet is transmitted such that the number of packets transmitted becomes equal to the delay ratio. Then, the delay request time calculation unit 430 calculates the delay request time. Specifically, since the delay request time is calculated by multiplying the delay time by the delay ratio, it is 20 μs×1=20 μs.

Even if the delay request time is 20 μs, a data processing time of 20 μs may be required to actually transmit a packet, and an actual delay time may be 480 μs. In this case, a gap time is 500 μs. Here, the gap time may be calculated based on a difference between a time when the transmission of the packet started and a time after the transmission of the packet and the completion of the delay time.

The delay ratio is updated to a value obtained by dividing the gap time calculated as described above by the delay time. Therefore, in the first step 510, the delay ratio is updated to 25 μs by 500 μs/20 μs.

In a second step 520, the delay ratio is 25, and the number of packets transmitted is initialized to 0. Therefore, packets are transmitted successively without a delay time until the number of packets transmitted becomes 25 or more.

Then, the delay request time is changed to 20 μs×25=500 μs according to the updated delay ratio. Here, assuming that the actual delay time is 500 μs and that the data processing time required to transmit the 25 packets is 50 μs, the gap time is 550 μs. Therefore, the delay ratio is updated again to 27.

That is, as the delay request time increases from 20 μs in the first step 510 to 500 μs, errors are reduced accordingly. When the delay ratio is updated to 27, the number of packets transmitted is initialized again to 0.

In a third step 530, the packet transmission resumes based on the delay ratio updated to 27 and the initialized number (0) of packets transmitted. That is, 27 packets are transmitted successively without a delay time, and then the delay request time is calculated again. Here, the delay request time is changed to 20 μs×27=540 μs, and the packet transmission is temporarily suspended for the calculated delay request time.

Likewise, since the delay request time has increased significantly compared with the delay request time in the first step 510, errors are reduced accordingly. Here, assuming that the actual delay time is 500 μs and that the data processing time is 50 μs, the delay ratio is 27 which is equal to the delay ratio in the second step 520.

In a fourth step 540, the delay ratio is equal to the delay ratio in the third step 530. Therefore, the same process is repeated. That is, packets are transmitted by repeating the above process until all data requested by the user are transmitted.

As described above, when the apparatus 400 for controlling the packet transmission interval has low resolving power, the delay request time is increased by correcting the delay ratio, thereby minimizing errors.

Figure 6:
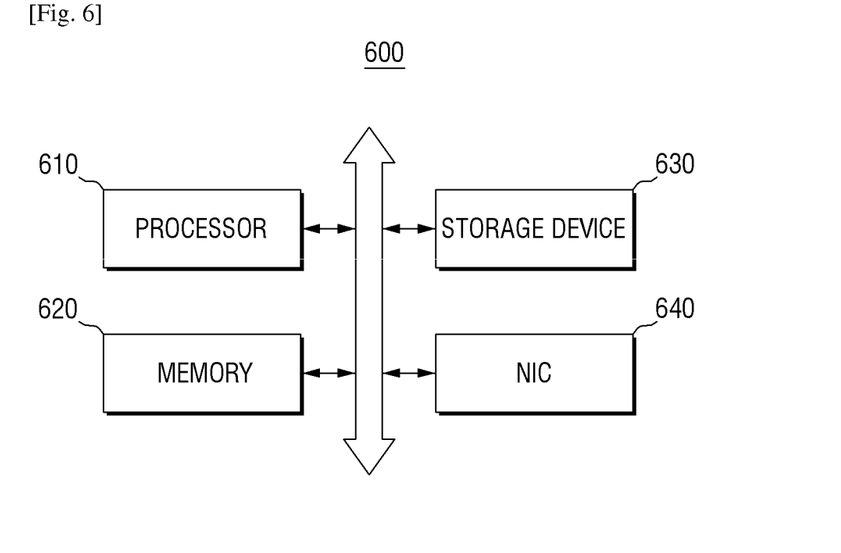
FIG. 6 is a block diagram of an apparatus for controlling a packet transmission interval according to another embodiment of the present invention.

FIG. 6 is a block diagram of a terminal device or server 600 which performs a method of controlling a packet transmission interval according to an embodiment of the present invention.

The terminal device or server 600 according to the current embodiment may include components illustrated in FIG. 6.

Specifically, the terminal device or sever 600 may include a processor 610 which executes commands, a memory 620, a storage device 630 which stores a program for executing a method of controlling a packet transmission interval, and a network interface (NIC) 640 which is used to transmit or receive data to or from a device connected to the terminal device or server 600.

The storage device 630 may store a program which executes comparing a preset delay ratio with the number of packets transmitted, transmitting packets until the number of packets transmitted becomes equal to or greater than the preset delay ratio, calculating a delay request time by multiplying the preset delay ratio by a preset delay time when the number of packets transmitted becomes equal to or greater than the delay ratio, generating a signal for suspending packet transmission during the calculated delay request time, suspending the packet transmission according to the generated signal and calculating a gap time based on a difference between a time when the suspension of packet transmission was terminated and a time when the packet transmission was started, and updating the delay ratio using the calculated gap time and initializing the number of packets transmitted.

As described above, a delay ratio may be updated based on a delay time desired by a user and an actual packet transmission interval measured, and packets may be transmitted according to the updated delay ratio. In so doing, the packets can be transmitted at constant speed, and CPU overload due to an excessive amount of computation required can be prevented.

In addition, a ratio of the time required to actually transmit a packet and the delay time desired by the user may be calculated, and then a number of packets corresponding to the calculated ratio may be transmitted successively. In so doing, delay errors can be offset, and a packet transmission interval can be adaptively corrected according to current network situation.

However, the effects of the present invention are not restricted to the one set forth herein. The above and other effects of the present invention will become more apparent to one of daily skill in the art to which the present invention pertains by referencing the claims.

What is claimed is:

1. A method of controlling a packet transmission interval, the method comprising:
   initializing a first delay ratio according to at least one from among network bandwidth, size of data to be transmitted, and central processing unit (CPU) resources allocated to an application;
   comparing the first delay ratio with a number of packets transmitted;
   transmitting packets until the number of packets transmitted becomes equal to or greater than the first delay ratio;
   calculating a delay request time when the number of packets transmitted becomes equal to or greater than the first delay ratio;
   generating a signal for suspending packet transmission during the calculated delay request time;
   suspending the packet transmission according to the generated signal and calculating a gap time based on a time difference between when the suspension of the packet transmission was terminated and when the packet transmission was resumed; and
   updating the first delay ratio to a second delay ratio using the calculated gap time and initializing the number of packets transmitted,
   wherein the calculating of the delay request time comprises calculating the delay request time by multiplying the first delay ratio by a preset delay time, wherein the preset delay time is a time interval between transmissions of individual packets at a preset transmission speed.

2. The method of claim 1, further comprising transmitting packets until the initialized number of packets transmitted becomes equal to or greater than the second delay ratio.

3. The method of claim 1, wherein the second delay ratio is obtained by dividing the gap time by the preset delay time.

4. The method of claim 1, wherein the first delay ratio can be changed according to at least one from among network bandwidth, size of data to be transmitted, and CPU resources allocated to an application.

5. An apparatus for controlling a packet transmission interval, the apparatus comprising:
- a processor; and
- a memory that stores instructions to be executed by the processor by causing the processor to execute:
  - a delay ratio initializer configured to initialize a first delay ratio according to at least one from among network bandwidth, size of data to be transmitted, and central processing unit (CPU) resources allocated to an application;
  - a comparator configured to compare a first delay ratio with a number of packets transmitted;
  - a packet transmitter configured to transmit packets until the number of packets transmitted becomes equal to or greater than the first delay ratio;
  - a delay request time calculator configured to calculate a delay request time when the number of packets transmitted becomes equal to or greater than the first delay ratio;
  - a delay processor configured to generate a signal for suspending packet transmission during the calculated delay request time;
  - a gap time calculation configured to calculate a gap time based on a time difference between when the suspension of the packet transmission was terminated and when the packet transmission was resumed; and
  - a transmission speed controller configured to update the first delay ratio to a second delay ratio based on the calculated gap time and initializes the number of packets transmitted,
- wherein the delay request time calculator is further configured to calculate the delay request time by multiplying the first delay ratio by a preset delay time, wherein the preset delay time is a time interval between transmissions of individual packets at a preset transmission speed.

6. The apparatus of claim 5, wherein the packet transmitter is further configured to, after the first delay ratio is updated and the number of packets transmitted is initialized, transmit packets until the initialized number of packets transmitted becomes equal to or greater than the second delay ratio.

7. The apparatus of claim 5, wherein the second delay ratio is obtained by dividing the gap time by the preset delay time.

8. The apparatus of claim 5, wherein the first delay ratio can be changed according to at least one from among network bandwidth, size of data to be transmitted, and CPU resources allocated to an application.

9. A non-transitory computer-readable recording medium having stored thereon a program which, when executed by a computer, causes the computer to perform a method comprising:
- initializing a first delay ratio according to at least one from among network bandwidth, size of data to be transmitted, and central processing unit (CPU) resources allocated to an application;
- comparing the first delay ratio with a number of packets transmitted; transmitting packets until the number of packets transmitted becomes equal to or greater than the first delay ratio;
- calculating a delay request time when the number of packets transmitted becomes equal to or greater than the first delay ratio;
- generating a signal for suspending packet transmission during the calculated delay request time;
- suspending packet transmission according to the generated signal and calculating a gap time based on a time difference between when the suspension of the packet transmission was terminated and when the packet transmission was resumed; and
- updating the first delay ratio to a second delay ratio using the calculated gap time and initializing the number of packets transmitted,
- wherein the calculating of the delay request time comprises calculating the delay request time by multiplying the first delay ratio by a preset delay time, wherein the preset delay time is a time interval between transmissions of individual packets at a preset transmission speed.

* * * * *